No. 870,077. PATENTED NOV. 5, 1907.
T. S. BENNETT.
BAND FOR BRACELETS.
APPLICATION FILED MAY 29, 1907.
2 SHEETS—SHEET 1.
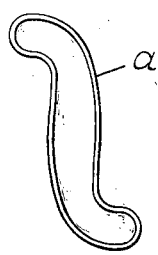
FIG.1.
FIG.2.
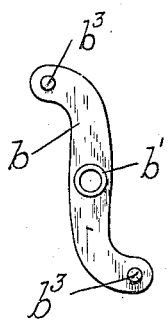
FIG.3.
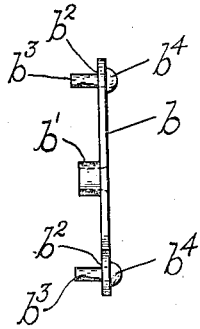
FIG.4.
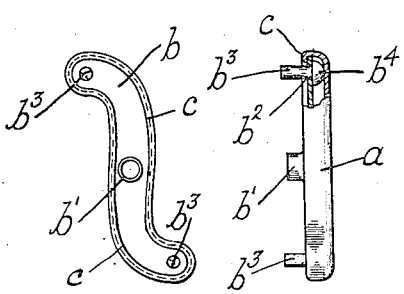
FIG.5.
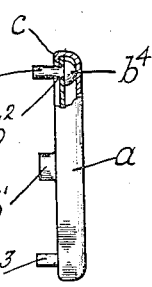
FIG.6.
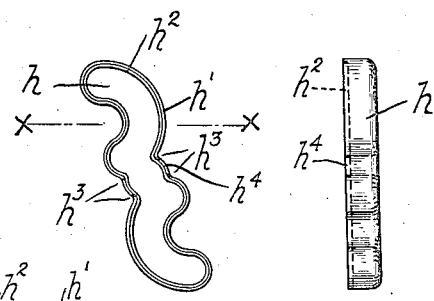
FIG.7.
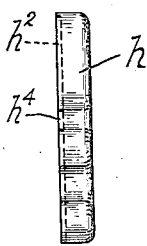
FIG.8.
FIG.9.
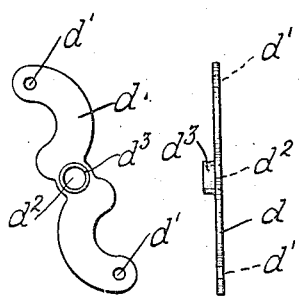
FIG.10. FIG.11.
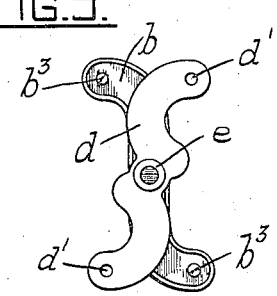
FIG.13.
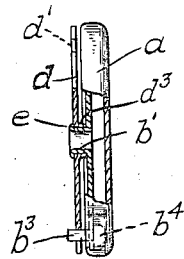
FIG.14.
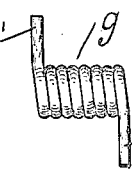
FIG.12.
WITNESSES.
A.G. Pieczentkowski.
Walter E. Gowdurn.
INVENTOR.
Thomas S. Bennett
By Horatio E. Bellows
ATTORNEY.

No. 870,077. PATENTED NOV. 5, 1907.
T. S. BENNETT.
BAND FOR BRACELETS.
APPLICATION FILED MAY 29, 1907.

2 SHEETS—SHEET 2.

WITNESSES.
A.G. Pieczentkowski.
Walter E. Gordwin.

INVENTOR.
Thomas S. Bennett
By Horatio C. Bellows
ATTORNEY.

UNITED STATES PATENT OFFICE.

THOMAS S. BENNETT, OF ATTLEBORO, MASSACHUSETTS.

BAND FOR BRACELETS.

No. 870,077.

Specification of Letters Patent.

Patented Nov. 5, 1907.

Application filed May 29, 1907. Serial No. 376,277.

*To all whom it may concern:*

Be it known that I, THOMAS S. BENNETT, a citizen of the United States, residing at Attleboro, in the county of Bristol and State of Massachusetts, have invented certain new and useful Improvements in Bands for Bracelets, of which the following is a specification, reference being had therein to the accompanying drawing.

My invention relates to bands for bracelets of the lazy-tongs type, and is an improvement upon my former Patent No. 709,195, and has for its essential objects, a minimizing of the number of parts and expense, also to provide a structure particularly adapted to the facile assemblage of parts, an improved spring action, and pivot-bearing, and superior wearing qualities.
To these ends particularly my invention consists in the novel construction and combination of parts hereinafter described.

Figure 15:
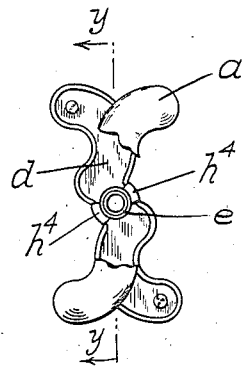
Figure 16:
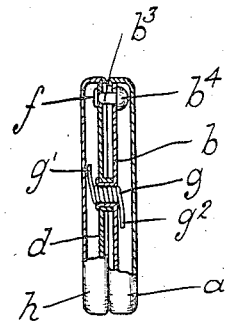
Figure 17:
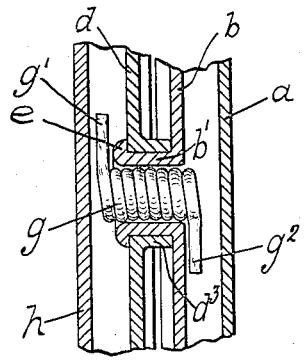
Figure 18:
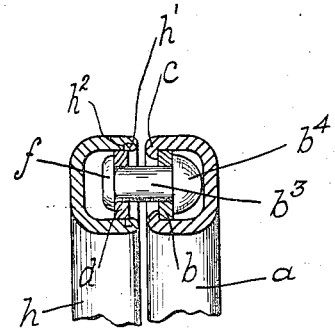
Figure 19:
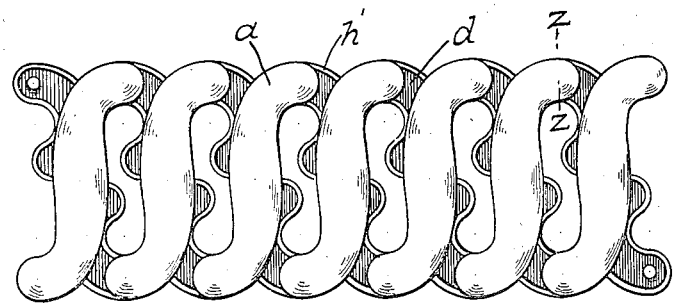

In the drawings which form a part of this specification, Figures 1 and 2 are rear and side elevations respectively of a front arm shell. Figs. 3 and 4 like elevations of the front arm plate of the front arm. Fig. 5, a rear elevation of the front arm. Fig. 6, a side elevation of the same partially broken away. Figs. 7 and 8, rear and side elevations respectively of the back arm shell.
Fig. 9, a section of the same on line x x of Fig. 7. Figs. 10 and 11, rear and side elevations respectively of the back arm plate. Fig. 12, a detail view of the spring. Fig. 13, a rear elevation of a front arm engaging the back arm plate. Fig. 14, a side elevation of the same partly in vertical central section. Fig. 15, a front elevation of a pair of arms with part of the front arm broken away. Fig. 16, a side elevation of the same partially in vertical section. Fig. 17, an enlarged vertical section of a portion of the arms on line y y of Fig.
15. Fig. 18, a section on line z z of Fig. 19, and Fig. 19, a front elevation of a complete band.

Like reference characters indicate like parts throughout the views.

My novel bracelet is formed by striking up from a thin sheet of metal, preferably from plated stock, a shell, $a$, with the precious metal upon the exterior or convex surface. A plate, $b$, of the same shape as the sheet is next stamped from thin stock having a hollow hub or bearing, $b'$, projecting from its surface intermediate its length. The ends of the plate, $b$, have perforations, $b^2$, to receive rivets, $b^3$, whose heads, $b^4$, rest against the opposite surface of the plate from the bearing, $b'$. The plate, $b$, is placed within the shell, $a$, with the rivet heads resting against the front wall thereof. The margin of the shell is then turned over upon the plate, $b$, forming a flange, $c$, which retains the two parts in engagement, as shown in Figs. 5 and 6, and completes the front arm. The next step in the formation of the band is to engage the plate of the back arm to the front arm. The back arm plate, $d$, as shown in Figs. 10 and 11, is cut from sheet metal and has perforations, $d'$, near its ends adapted to receive the rivets, $b^3$. It has also an opening, $d^2$, midway its length, around which is a sleeve, $d^3$, integral with the plate, $d$. This plate is laid upon the front arm, the parts being in a horizontal position, with the collar or hub, $d^3$, loosely mounted on the bearing, $b'$, and having the rivets, $b^3$ projecting through the opening, $d'$. The bearing, $b'$, is longer than the collar, $d^3$, and the projecting portion of the former is by any convenient tool turned outwardly to form a retaining flange, $e$, as shown in Fig. 14. The ends of the rivets, $b^3$ which project through the plate, $d$, are riveted over with a riveting tool to form the heads or enlargements, $f$. The engaging operations above described are performed upon the entire series of arms extending throughout the length of the band, the parts being laid for this purpose in a horizontal position. The coil springs, $g$, having free ends, $g'$, and $g^2$ are dropped into such of the bearings, $b'$, of the arm couplets of the band as the tension of the particular bracelet may require. It now remains only to apply the rear shell which completes the back arm to the plate, $d$. The rear shell, $h$, is cupped up from a sheet of preferably plated sheet metal, with the precious metal upon the exterior. The margin is cut away to form a flange, $h'$, and shoulder, $h^2$. The flange is transversely sawed or cut at points, $h^3$, upon both sides of the shell, near its middle. The cut portions form ears, $h^4$, which as shown in Fig. 15, are bent down upon the plate, $d$. The flange, $h'$, however, is folded upon itself, with its margin resting upon the shoulder, $h^2$. This treatment of the margins of the rear arm shells insures a fine finish to band when viewed from the front, as in Fig. 19, where the ears, $h^4$, are obscured, and no base metal edges are exposed to view or invite discoloration of the adjacent plated surfaces. The free ends $g'$ and $g^2$ of the spring press respectively against the sides of the shells, $h$ and $a$.

By the above construction, it will be observed that the spring retaining plates, rivet plates, and auxiliary plates of my former invention are dispensed with; that a simple and more secure central pivoting device is employed; and that the described structure permits a more speedy and convenient assemblage of the parts. My novel structure also presents a smooth, unseamed, plated surface to the arm.

What I claim is,

1. A lazy-tongs band composed of pairs of arms pivoted to each other, each pair of arms comprising first, a front arm provided with rivets upon its ends, a tubular bearing projecting from the face of said arm intermediate the end rivets, a flange upon the end of the baring, and second, a back arm provided with means for receiving the rivets, and a hub loosely mounted upon the tubular bearing and retained thereon by said flange.

2. A lazy-tongs band composed of pairs of arms pivoted to each other, each pair of arms comprising first, a front arm provided with rivets upon its ends, a tubular bearing projecting from the face of said arm intermediate the end rivets, and second, a back arm provided with means for receiving the rivets, and a hub loosely mounted upon the tubular bearing, and third, a spring within the tubular bearing having free ends which bear against the walls of both arms.

3. A lazy-tongs band composed of pairs of arms pivoted to each other, each pair of arms comprising first, a front arm comprising a shell having a marginal flange, a rivet carrying plate engaged by the flange, and provided with perforations in its ends to receive the rivets, a hollow bearing projecting from the plate, and second, a back arm comprising a shell provided with marginal ears, a plate retained in the shell by the marginal ears and provided with openings for the rivets, a hub upon the last mentioned plate loosely mounted on the bearing, and third, rivets passing through the openings of both plates, and heads upon one end of the rivets resting against the shell of the front arm.

4. A lazy-tongs band composed of pairs of arms pivoted to each other at or near their centers, each pair of arms comprising a front arm provided with a shell having integral portions inclosing its outer face and sides, and a back arm provided with a shell having integral portions inclosing its outer face and sides.

In testimony whereof I have affixed my signature in presence of two witnesses.

THOMAS S. BENNETT.

Witnesses:
HORATIO E. BELLOWS,
WALTER E. GOODWIN.